Patented Feb. 6, 1923.

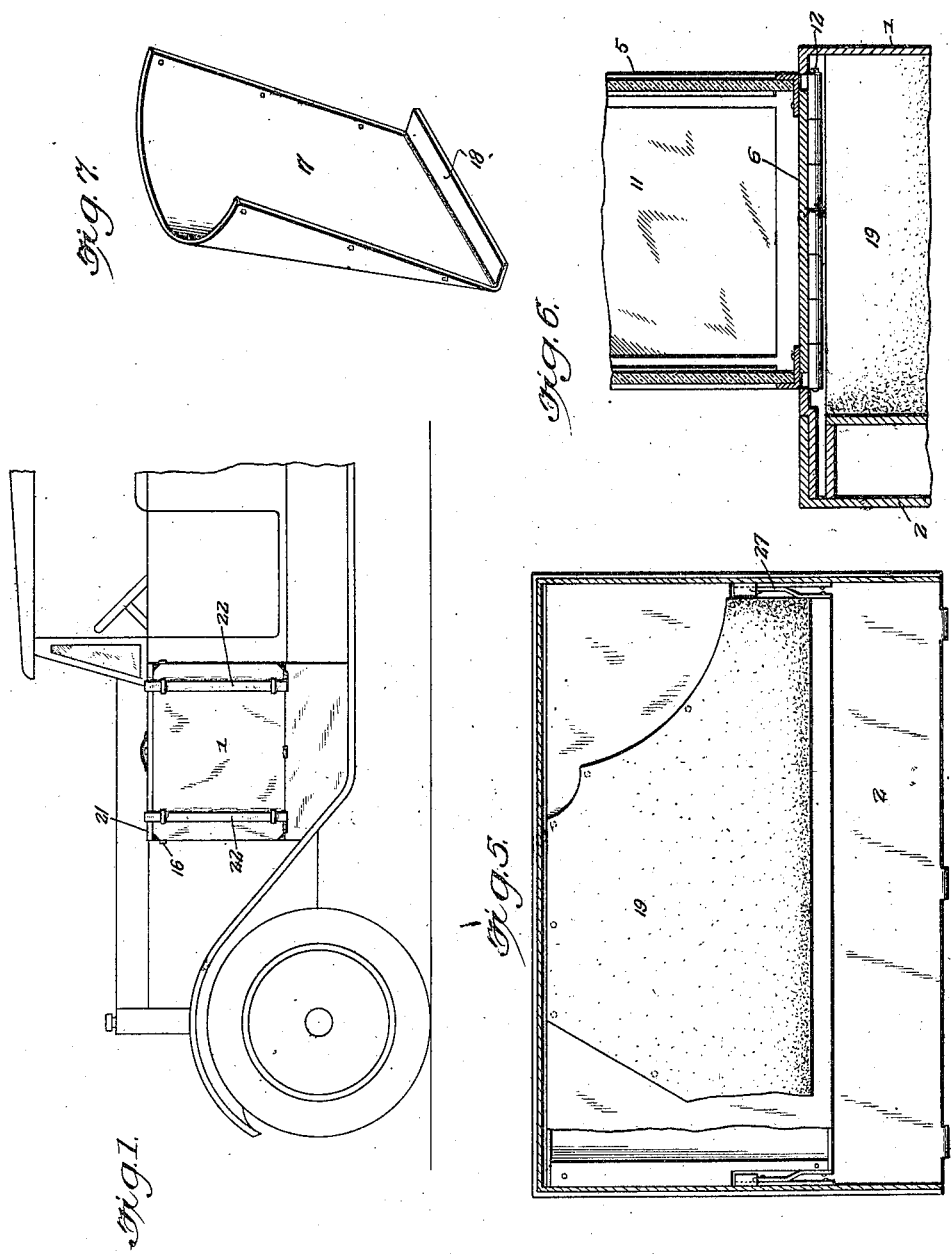

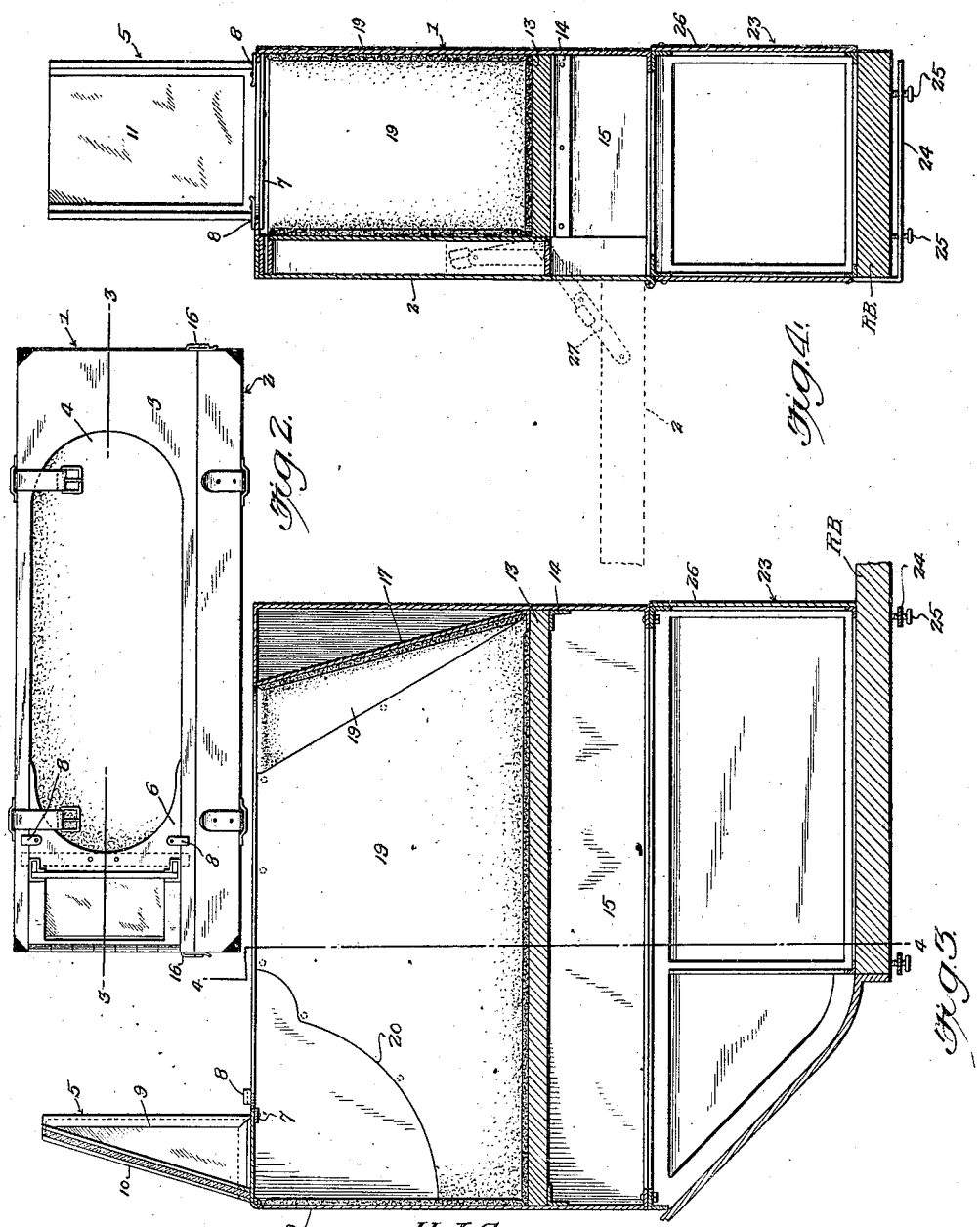

1,444,679

UNITED STATES PATENT OFFICE.

HARRY JACOB GEORGE, OF LONG BEACH, CALIFORNIA.

DOG CARRIER FOR AUTOMOBILES.

Application filed November 4, 1921. Serial No. 512,840.

*To all whom it may concern:*

Be it known that I, HARRY JACOB GEORGE, a citizen of the United States, residing at Long Beach, in the county of Los Angeles and State of California, have invented certain new and useful Improvements in Dog Carriers for Automobiles, of which the following is a specification.

This invention relates to carrier attachments for automobiles and more particularly to dog carriers.

The object of the invention is to provide a neat presentable carrier for mounting on the running board of an automobile so constructed that a dog riding therein will be protected against wind, dust, mud and the weather and which also affords security for the dog by preventing him from jumping out and hanging himself.

Another object is to provide a carrier of this character which while upholstered to render it thoroughly comfortable for the dog has the cushions and upholstery made removable to insure its sanitary condition.

Another object is to provide a carrier of this character made in the semblance of a suitcase and equipped with a foldable wind shield adapted to be folded down into the carrier when not in use.

Another object is to provide a carrier of this character so mounted and constructed that a tool box is also provided below the dog seat and which is completely concealed.

With these and other objects in view, the invention consists in certain novel features of construction as hereinafter shown, described, and claimed.

In the accompanying drawings:—

Figure 1 represents a side elevation of the front portion of an automobile with this improved carrier shown mounted thereon.

Fig. 2 is a top plan view of the carrier detached.

Fig. 3 is a longitudinal section taken on the line 3—3 of Fig. 2.

Fig. 4 is a transverse section taken on the line 4—4 of Fig. 3.

Fig. 5 is a longitudinal section of a portion of the carriier.

Fig. 6 is a detail transverse section thereof; and

Fig. 7 is a perspective view of the rear inclined member of the carrier which prevents the dog being thrown back in travelling.

In the embodiment illustrated, the carrier constituting this invention is made in the semblance of a suitcase being preferbaly constructed of sheet metal suitably braced and ornamented.

This improved carrier comprises a body member 1 having a hinged side member 2 similar to a suitcase. The top portion 3 thereof has a cut out portion 4 for the head of the dog to project through when riding. This cut out or opening 4 is preferably rounded at its opposite ends as shown clearly in Fig. 2 and terminates short of the front end of the carrier. Between the front end of the opening 4 and the end wall of the carrier is mounted a wind shield 5. The front portion of the top of the carrier supports the wind shield 5 and is designed to shut down within the carrier proper when not in use carrying with it the wind shield. This hinged member 6 is provided on its inner face with a transversely extending bar 7 the ends of which project beyond the edge walls of the member 6 so that when said member is swung into open position these ends will engage adjacent portions of the top of the carrier 1 and limit the opening movement of the wind shield so that it will be positioned upright as shown in Fig. 3. The folding portion 6 of the top of the carrier 1 is also provided on its upper face with pivoted buttons 8 adapted to be turned into overlapping engagement with the top of the case when the wind shield is swung into upward operative position to hold said shield against folding inwardly.

The wind shield 5 comprises a metallic frame 9 having guides 10 at its opposite sides or ends to receive the glass 11 which is slidable in these guides and may be removed when desired. The member 6 which carries the wind shield 5 is hingedly connected with the upright front wall of the carrier 1 by a pintle 12 which is removable when desired to provide for the removal of the wind shield together with the member 6 which carries it.

A seat board 13 is mounted within the carrier and extends the full length and width thereof being supported on suitable angle irons 14 carrried by the side walls of the carrier. This board 13 is spaced a suitable distance from the bottom of the carrier to provide below it a chamber 15 which may be used as a tool box or for containing other articles. The hinged side 2 of the carrier also forms a closure for the chamber 15 as is shown clearly in Fig. 4. Suitable fasteners 16 are provided at the ends of the closure 2 for securing it in closed position.

An inclined removable brace 17 is mounted at an incline at the rear end of the carrier as is shown clearly in Fig. 3 and is made arcuate in cross section as shown clearly in Fig. 7 with a flange 18 provided at its lower end which is designed to engage the upper face of the rear end of the board 13 and clampingly secure it to the angle iron 14 the upper edge of the member 17 being designed to pass under the top portion of the carrier at the rear of the opening 4 therein.

Suitable padding or upholstery 19 is removably attached to the side walls, the bottom and the bracing member 17 of the carrier as well as to the front wall thereof to prevent the dog from being hurt during the riding over rough roads. This upholstery 19 is preferably secured by snap fasteners to provide for its removal for cleaning and other purposes thereby insuring the sanitary condition of the carrier.

The front portion of the upholstery which covers the side and end members of the carrier is cut away as shown at 20 to provide for the free swinging inward of the member 6 with the wind shield attached thereto.

A removable top closure 21 is provided for use when the carrier is not occupied by a dog and which protects the interior thereof against weather adapting it also to be used as a container for other articles.

A pair of straps 22 such as are ordinarily employed in connection with suitcases are shown arranged transversely around the carrier and are adapted to be secured over the top 21 to hold said top in operative position.

The carrier 1 is mounted on a suitable support clamped to the running board RB of the automobile and here shown in the form of a bracket or skeleton frame 23. This bracket is here shown formed of angle iron and the clamping members 24 are cast integral therewith. As shown clearly in Fig. 3 the carrier is riveted to this bracket 23 and the bracket is detachably carried by the running board being provided with two laterally extending clamping arms 24 which are held engaged with the running board by set screws 25. If desired the bracket 23 or skeleton frame may be enclosed within a casing composed of suitable material here shown at 26 and the chamber so formed may be used for housing tools or any other articles.

From the above description it will be obvious that a carrier constructed as herein shown and described will have the semblance of a suitcase and while primarily intended for use as a dog carrier obviously may be used for many other purposes the upholstery 19 being removable after a dog has been carried therein so that the carrier may be thoroughly cleansed if desired for using it as a container for other articles.

In the use of the carrier for transporting dogs the cover 21 is removed and the member 6 carrying the wind shield 5 is swung upward into the position shown in Fig. 3 and the buttons 8 are turned to hold the member 6 in this position. The lid 2 is then opened downwardly to permit the dog to step into the carrier and after he enters the aforesaid compartment the closure 2 is secured in the position shown in Figs. 1 and 2 and the dog will ride comfortably with his head sticking out through the opening 4. If desired this opening 4 may be of a size sufficient only for the dog's head to project therethrough so that there is no danger of his jumping out of the carrier.

The closure 2 is shown provided with hinges 27 shown clearly in Figs. 4 and 5 which are designed to limit the opening movement of the closure 2 and hold it in a plane at right angles to the carrier so as to provide a platform for the dog to step in and out of the carrier.

It is obvious that the slanting curved brace 17 will permit the dog to brace himself when the automobile is travelling fast or passes over obstacles in the road.

When the carrier is not required for use all that is necessary to remove it is to unscrew the set screws 25 and slip the clamps 24 transversely off the running board.

The supporting bracket 23 which carries the carrier 1 is preferably shaped to conform to the fender of the automobile to which the carrier is to be applied, the body of the said bracket being shown inclined to adapt it to rest on the fender where it joins the running board, as is shown clearly in Fig. 1.

The preferred embodiment of the invention is disclosed in the drawings and set forth in the specification, but it will be understood that any modifications within the scope of the claimed invention may be made in the construction without departing from the principle of the invention or sacrificing any of its advantages:

I claim:—

1. A dog carrier for automobile running boards comprising a closed container having an opening in its top, a portion of said top adjacent said opening being hinged to fold down into the carrier, and a wind shield mounted on the outer face of said hinged top portion.

2. A dog carrier for automobile running boards comprising a closed container having an opening in its top and a hinged side member, a portion of the top adjacent said opening being hinged to fold down into the container and a wind shield mounted on the outer face of said hinged top portion to be folded into the container with said top portion.

3. A dog carrier for automobile running boards comprising a closed container having an opening in its top for the passage of a dog's head therethrough, a seat within said container and removable upholstery lining the container and the seat.

4. A dog carrier for automobile running boards comprising a closed container having an opening in its top for the passage therethrough of a dog's head, a hinged side member having means to hold it in open position to form a platform for the entrance and exit of the dog, and a seat for the dog located in said container above the bottom thereof.

5. A dog carrier for automobile running boards comprising a closed container having an opening in its top for the passage of a dog's head therethrough, a door for the entrance of the dog and a brace located in said container to prevent the dog being thrown around therein when traveling over rough roads.

6. A carrier of the class described comprising a closed container having an opening at its top, a horizontal partition removably mounted in said container to form a seat for the dog, a transversely curved brace mounted at the rear of said container between the top and said partition and equippped with a flange to form a spring clamping member for the partition.

7. A carrier of the class described comprising a closed container having an opening in its top a portion of said top adjacent said opening being hinged to fold downwardly into the container, a wind shield supporting frame mounted on the outer face of said hinged top portion and having guides to removably hold a glass therein, a cross bar carried by said hinged top portion with the ends thereof projecting beyond the side edges of said portion to form a stop for limiting the opening movement of said portion and pivoted buttons carried by said top portion to engage the container and hold said portion against accidental folding.

In testimony whereof, I affix my signature hereto.

HARRY JACOB GEORGE.